April 20, 1954 G. L. ELLIS 2,675,836
ADJUSTABLE GAUGE FOR CUTOFF SAWS
Filed July 18, 1949 3 Sheets-Sheet 1
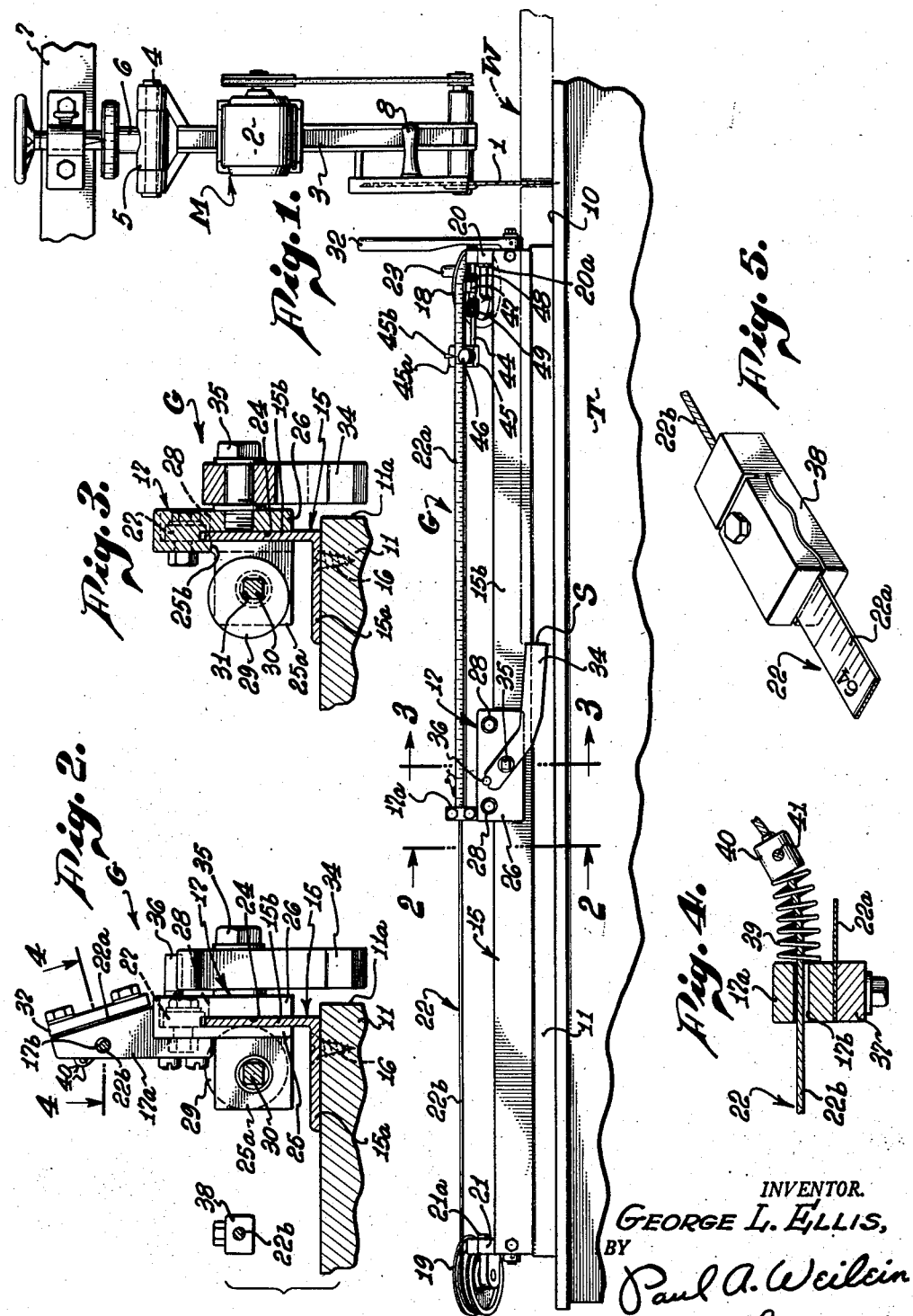
INVENTOR.
GEORGE L. ELLIS,
BY
Paul A. Weilein
ATTORNEY.

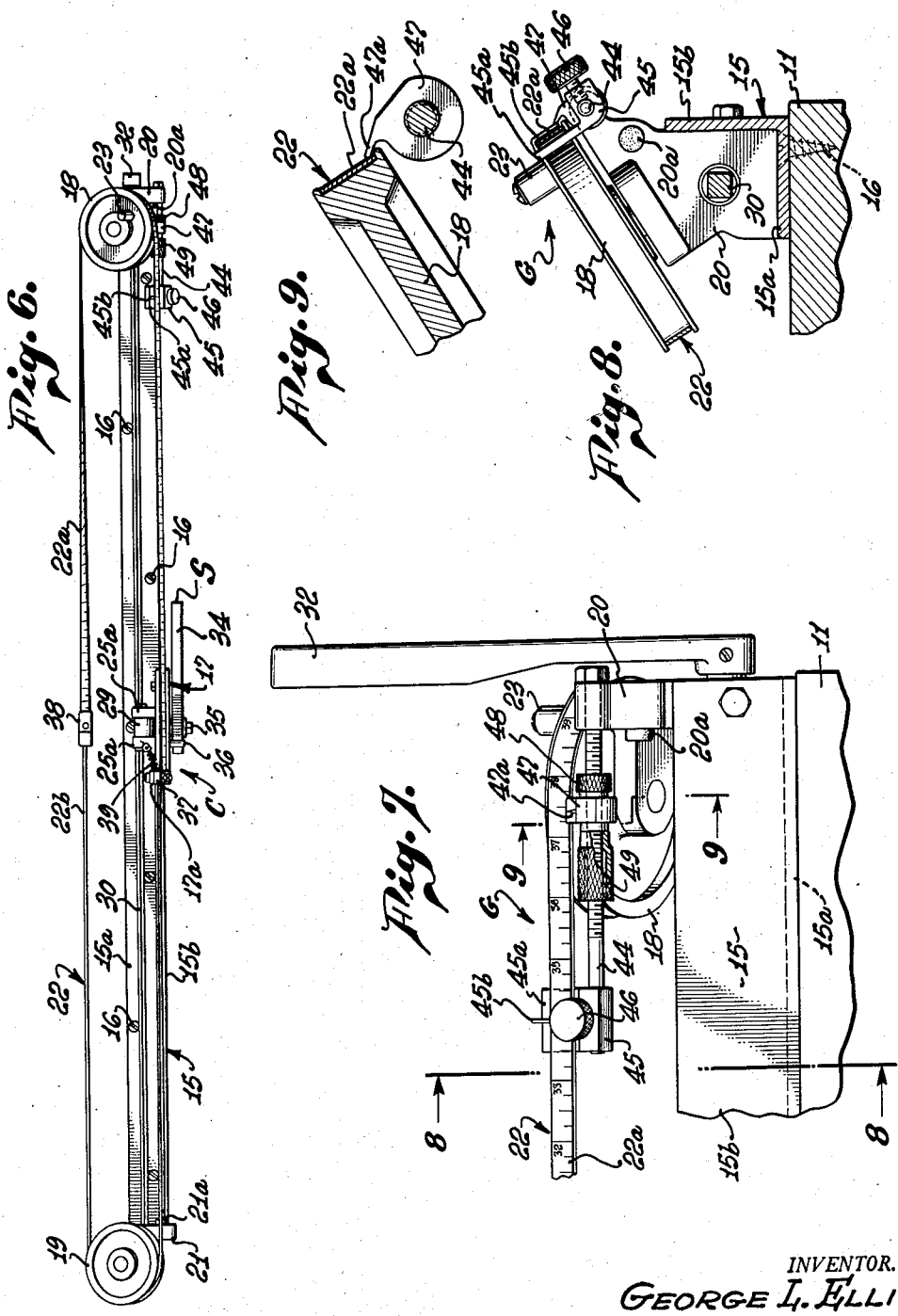

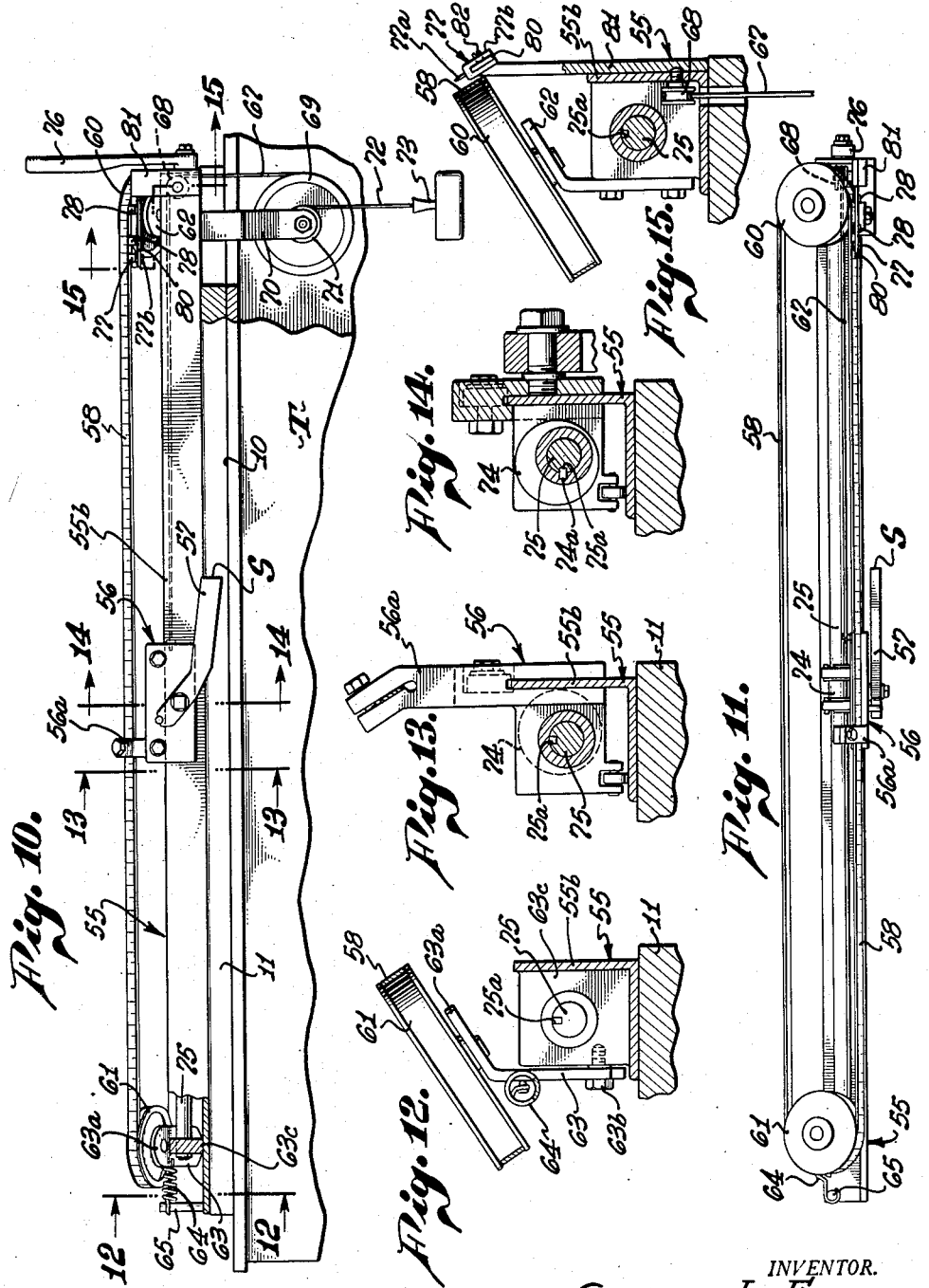

Patented Apr. 20, 1954

2,675,836

UNITED STATES PATENT OFFICE 2,675,836

ADJUSTABLE GAUGE FOR CUTOFF SAWS

George L. Ellis, Los Angeles, Calif.

Application July 18, 1949, Serial No. 105,398

7 Claims. (Cl. 143—174)

This invention relates to an adjustable gauge for use with a power saw to facilitate cutting of the stock or material to a predetermined dimension.

It is an object of this invention to provide improved apparatus of this character.

A type of saw mechanism in extensive use at the present time, comprises a circular saw suspended closely above a table top or other horizontal surface for optional movement by the operator in the plane of the saw and across stock or material resting on said surface, to perform a cutting operation thereon, such as cutting the stock to a predetermined length.

It is an other object of this invention to provide improved apparatus for use in connection with such mechanism, having an adjustable gauging surface movable toward and away from the saw in accordance with the required length of stock to be cut.

It is another object of this invention to provide such apparatus which is continuously adjustable over a wide range of lengths.

It is another object of this invention to provide such apparatus having novel means indicating the length for which it is set.

It is another object of this invention to provide such apparatus which is readily adjustable throughout its entire range without requiring the operator to leave his usual position for operating the saw.

It is another object of this invention to provide such apparatus wherein the setting means for positioning the gauging surface and the indicating means are all at that end of the frame adjacent the saw mechanism.

It is another object of this invention to provide such apparatus comprising a unitary structure adapted for use with existing installation of such saw mechanisms.

It is another object of this invention to provide such apparatus wherein the gauging surface may be set for a length differing from the nominal length by a known amount without necessitating any calculations.

It is another object of this invention to provide such apparatus having a pair of indicators for showing respectively the nominal length for which the gauge is set, and the amount by which the cut length of the work piece will differ therefrom.

This invention possesses many other advantages, and has other objects which may be made more easily apparent from a consideration of several embodiments of the invention. For this purpose there are shown several forms in the drawings accompanying and forming part of the present specification. These forms will now be described in detail, illustrating the general principles of the invention; but it is to be understood that this detailed description is not to be taken in a limiting sense since the scope of the invention is best defined by the appended claims.

In the accompanying drawings:

Figure 1 is a side elevation of a gauging device incorporating the invention installed for use with a conventionally arranged cut-off saw;

Figures 2 and 3 are cross sections on an enlarged scale, taken substantially as indicated by correspondingly numbered lines of Figure 1, Figure 3 showing a different operating position of the parts;

Figure 4 is a detail section on a further enlarged scale, taken substantially as indicated by line 4—4 of Figure 2;

Figure 5 is a perspective of a fragment of the measuring element;

Figure 6 is a plan view of the device of Figure 1 on a reduced scale;

Figure 7 is a side elevation on an enlarged scale of the operator's end of the device of Figure 1;

Figure 8 is a cross section taken substantially as indicated by line 8—8 of Figure 7;

Figure 9 is a fragmentary section on an enlarged scale taken substantially as indicated by line 9—9 of Figure 7;

Figure 10 is a side elevation of a modified form of the gauging device;

Figure 11 is a plan view thereof; and

Figures 12 to 15 are cross sections on an enlarged scale taken substantially as indicated by the correspondingly numbered lines of Figure 10, Figure 14 showing a different operating position of the parts.

Referring to Figure 1, a conventional cut-off saw mechanism of the type sometimes known as a swing cut-off saw, is indicated generally by M and comprises a vertically disposed circular saw 1, driven by a motor 2, and rotatably mounted at the lower end of an arm 3. The arm 3 is supported for swinging movement in the plane of the saw 1 by a pin 4 mounted in a stationary member 5 adjustably attached by the aid of a bracket 6 to a fixed support 7. A table or other structure T provides a horizontal surface 10 for supporting the stock to be cut by the saw 1.

As is well understood, the stock W is positioned on the table surface 10 against a longitudinally extending guide 11 thereon with the point to be cut aligned with the saw 1, and the operator, by the aid of the handle 8, then causes the saw 1 to traverse the stock W and form the cut. To facilitate cutting the stock to a desired length, the gauging device of the invention indicated generally by G is mounted on the table T being secured on the guide 11. The device G provides a gauging surface S adjustable toward and away from the saw 1 and serving as a stop engageable by the end of the stock W; the distance of the surface S from the saw determining the length to which the stock will be cut, means being provided for indicating the distance.

Referring in detail to the structure, the device G comprises an elongated angle bar 15 serving as a frame, the horizontal leg 15–a of the bar 15 being secured to the guide 11 by screws 16, the vertical leg 15–b serving as a guide rail for movably mounting a carriage member 17. As shown in Figures 2, 3 and 8, the frame 15 is set back from the face 11–a of the guide 11, facilitating manipulation of the work piece or stock W by the operator.

Sheave wheels 18 and 19 are rotatably mounted adjacent the opposite ends of the frame 15 by the aid of brackets 20 and 21 respectively secured to the frame 15. A belt-like element 22 extends between the wheels 18 and 19, one reach thereof being connected to the carriage 17. Thus, by rotating one of the sheaves 18 or 19, the carriage 17 may be moved along the supporting rail 15–b, for which purpose the sheave 18, which is at that end of the frame 15 adjacent the saw mechanism M, is provided with an operating knob 23. Resilient pads or bumpers 20–a, 21–a are provided respectively on the brackets 20 and 21 to engage the carriage 17 and serve as stops to limit its travel along the frame 15.

The carriage 17 comprises a slotted wall 24 with portions 25 and 26 depending on opposite sides of the frame leg 15–b, a pair of rollers 27 rotatably mounted in cavities 28 in the upper portion of the wall 24, serving to support the carriage 17 by engaging the upper edge of the leg 15–b. The inner wall portion 25 has a pair of bearing lugs 25–a projecting inwardly on opposite sides of an opening 25–b, for rotatably supporting a clamping cam 29 adapted to extend through the opening 25–b, and engage the frame leg 15–b. The arrangement is such that appropriate angular movement of the cam 29 will clamp the leg 15–b between the cam 29 and the outer depending wall portion 26.

For operating the cam 29, a shaft 30 is provided which extends longitudinally of the frame member 15 and is supported at its opposite ends by the brackets 20 and 21. The cam 29 is slidable longitudinally on the shaft 30 and is in driving relation therewith by being splined thereto. Thus, the shaft 30 may be square and engage a square opening 31 in the cam 29. The shaft 30 projects through the supporting bracket 20 which is at that end of the frame 15 adjacent the saw mechanism M and has an operating handle 32 secured at its outer end.

The gauging surface S is formed on the end of an arm 34 pivotally mounted on the carriage 17 by the aid of a pin 35 for movement into and out of gauging position. Thus, referring to Figure 1, the arm 34 is urged in a clockwise direction about the pin 35 and against a stop pin 36 so that the gauging surface S is normally facing the saw 1. However, the arm 34 may be swung upwardly to clear the work piece or stock W when desirable, as for example, to permit the cutting of the stock to a length greater than the gauge is set for without disturbing the setting, or to cut a length greater than the maximum length accommodated by the gauge.

Means are provided for indicating the distance between the gauging surface S and the saw 1. For this purpose, at least a portion of the belt-like element 22 is appropriately graduated in inches and fractions thereof and may conveniently comprise a section 22–a of a conventional steel tape or the like of suitable length. One end of the belt section 22–a is secured to an arm 17–a on the carriage 17 as by a clamping block 37, the belt section 22–a extending therefrom toward the saw mechanism M and partly about the sheave 18, the other end being secured to a steel cable or the like 22–b by the aid of a connector 38 (Figure 5). This cable 22–b extends from the connector 38 and partly about the other sheave 19 for attachment to the carriage 17.

To maintain the belt element 22 appropriately tensioned, the free end portion of the cable 22–b is passed through a clearance opening 17–b in arm 17 and a compression spring 39 is confined between the arm 17 and a collar 40 secured on the end of the cable 22–b by a set screw 41.

Means are provided on the frame member 15 at that end adjacent the saw mechanism M for cooperating with the graduated belt section 22–a to indicate the position of the gauging surface S. Thus, referring to Figures 7 and 8, a rod 44 supported at one end by the end bracket 20, extends a short distance substantially parallel with the belt section 22–a and slidably mounts an element 45 having an upward extension 45–a passing behind the belt 22–a and having a wire index or pointer 45–b extending in close proximity across the face of the belt 22–a for cooperating with the indicia thereon. The element 45 is maintained in adjusted position by a set screw 46 which engages the rod 44.

A second index or pointer is provided between the pointer 45–b and the saw 1. Thus, an element 47 bearing the pointer 47–a is slidable on the rod 44, being secured in adjusted position by the knurled nuts 48 and 49 threaded on the rod 44 and between which the element 47 is confined. This second index 47–a enables the setting of the gauging surface S for cutting pieces of a length less than a nominal length in a simple manner and without need of calculation. For this purpose, the index 47–a is set at the required decrease in length from the index 45–b, as indicated on the graduated belt section 22–a, and the belt 22 is then set to bring the nominal length opposite the index 47–a instead of the index 45–b.

In Figure 7, the index 45–b is shown at the mark "34" on the graduated belt section 22–a, and the gauging surface S is accordingly spaced 34 inches from the saw 1 for cutting pieces of that length. The other index 47–a is shown as spaced three and three eighths inches from the index 45–b as indicated by the graduations on the belt 22. Accordingly, if the belt 22 is adjusted to bring the mark "34," which may be considered the nominal length, into alignment with the index 47–a, the gauging surface S will be spaced 34 inches less 3 and ⅜ inches or 30 and ⅝ inches from the saw. It will be obvious that the distance at which the frame 15 is mounted from the saw 1 and the graduated belt section 22–a must be so correlated that the gauging surface S will be spaced from the saw 1 by the distance indicated on the belt section 22–a by the index 45–b.

In using the device, the operator, by means of the knob 23, rotates the sheave wheels 18, adjusting the position of the carriage 17 until the index 45–b shows on the graduated belt section 22–a that the gauging surface S is spaced from the saw 1 by a distance equal to the desired length of the cut stock, and then manipulates the lever 32 to clamp the carriage 17 against accidental movement. This distance can be altered when desired by operating the lever 32 to release the carriage 17 for further movement by appropriate rotation of the sheave wheel 18. Optionally, if the length to which the stock is to be cut is greater than the distance between the surface S and the saw 1, the carriage 17 when released may be moved to the desired position by pushing against the surface S with the end of the stock. An important feature of the device is the arrangement of the parts so that the setting of the gauging surface can be readily accomplished without requiring the operator to leave the position from which he operates the saw mechanism M. As previously discussed, if it is desired to cut a piece longer than that for which the device is set without changing the setting, the arm 34 carrying the gauging surface may be swung upwardly to clear the stock.

In that form of the invention shown in Figures 10 to 15, an elongated angle bar frame 55 is provided as before, being mounted on the guide 11, movably supporting a carriage 56 quite similar to the carriage of the first described form of the invention and straddling the vertical leg 55-b of the frame 55. The carriage 56 pivotally mounts the arm 57 which carries the gauging surface S and is movable into and out of gauging position as before.

The position of the carriage 56 on the frame 55 is adjusted by the aid of a graduated belt 58 which extends over the sheave wheels 60 and 61 rotatably mounted on brackets 62 and 63 respectively adjacent the opposite ends of the frame 15 and is anchored to the carriage 56 by the aid of arm 56-a thereon. To maintain the belt 58 properly tensioned, the bracket 63 comprises an arm 63-a which mounts the sheave 61 and is pivotally supported at 63-b on a block 63-c fixed to the bar 75 for movement toward and away from the other sheave 60, being urged away therefrom by a tension spring 64 connected between the arm 63-a and a post 65 on the frame 15.

The carriage 56 is urged along the frame 15 toward that end adjacent the saw mechanism M by a cable 67, which passes over a pulley 68 to a winding drum 69 rotatably supported by the aid of arms 70 depending from the frame 15. A smaller winding drum 71 is connected to rotate with drum 69 and has a cable 72 wound thereon suspending a weight 73. The arrangement is such that the weight 73 urges the drum 69 in cable winding direction, the dual drum construction reducing the required travel of the weight 73 for a given movement of the carriage 56.

The carriage 56 is clamped in adjusted position by a cam 74 rotatably mounted on the carriage and movable into and out of engagement with the vertical frame leg 55-b by the aid of shaft 75 extending lengthwise of the frame 55 and having an operating arm 76. The cam member 74 is slidable on the shaft 75 and is in driving relation therewith by the aid of a splined connection formed by key 74-a which engages a key way 75-a extending substantially the full length of the shaft.

A plurality of indices are provided for cooperating with the graduated belt 58 to indicate the relationship between the gauging surface S and the saw 1, the main index showing the true distance being indicated by the numeral 77, one or more secondary indices each being indicated by the numeral 78. Each of the indices as 77 comprises a pointer 77-a formed on a U-shaped clip 77-b slidable on a bar 80 extending parallel with the belt 58 from a suitable support 81 on the frame 15, the clip 77-b being secured in adjusted position by a set screw 82.

The manner of operating this form of the device is quite similar to that of the first described form, it being noted that all parts are arranged so that the operator is not required to leave his operating position adjacent the saw mechanism M. However, since the carriage 56 is biased by the mechanism 67—73 to a position setting the surface S for minimum cutting length, the position of the carriage for increased lengths is adjusted by pushing with the end of the stock against the gauging surface S with sufficient force to overcome the biasing force.

I claim:

1. In an adjustable gauge for use with a cut-off saw mechanism: an elongated frame adapted for mounting to extend transversely away from the saw and with one end adjacent said mechanism; a sheave wheel rotatably mounted adjacent each end of said frame; a flexible element extending between said sheave wheels for longitudinal movement in response to rotation thereof; a member having a gauging surface, movable longitudinally on said frame and attached to said element, whereby said surface is adjustable with respect to said saw upon movement of said element; a rod fixed to said frame; a main index element slidable on said rod toward and away from the saw and cooperating with said scale to indicate the distance of said gauging surface from the saw; and a second index element slidable on said rod intermediate said main index and said saw and cooperating with said scale for locating said gauging surface at a position closer to said saw by a desired amount.

2. In an adjustable gauge for use with a cut-off saw mechanism: an elongated frame adapted for mounting to extend transversely away from the saw and with one end adjacent said mechanism; a sheave wheel rotatably mounted adjacent each end of said frame; a flexible element extending between said sheave wheels for longitudinal movement in response to rotation thereof; a member having a gauging surface, movable longitudinally on said frame and attached to said element, whereby said surface is adjustable with respect to said saw upon movement of said element; a rod fixed to said frame in parallel relation to said element; a graduated scale on said element; a main index slidable on said rod toward and away from the saw and cooperating with said scale to indicate the distance of said gauging surface from the saw; a second index slidable on said rod intermediate said main index and said saw and cooperating with said scale for locating said gauging surface at a position closer to said saw by a desired amount on said scale; and means for adjusting said second index including nuts adjustable on said rod on opposite sides of said second index.

3. In an adjustable gauge for use with a cut-off saw mechanism: an elongated frame adapted for mounting to extend transversely away from the saw and with one end adjacent said mechanism; a sheave wheel rotatably mounted adjacent each end of said frame; a flexible element extending in a belt-like manner between said sheave wheels; a member having a gauging surface, movable longitudinally on said frame; means anchoring the opposite ends of said flexible element to said member, whereby said surface is adjustable with respect to said saw upon movement of said element, the means anchoring one of said ends including a spring interposed between said end and said member for tensioning said element; and an element mounted on said frame adjacent said flexible element and cooperating therewith to form a scale and pointer mechanism to indicate the position of said surface with respect to the saw.

4. In an adjustable gauge for use with a cut-off saw mechanism: an elongated frame adapted for mounting to extend transversely away from the saw and with one end adjacent said mechanism, said frame including a longitudinally extending, upstanding rail; a member having a gauging surface, and straddling said rail, supported and guided thereon for movement longitudinally of said frame; means adjacent said end for indicating the position of said surface with respect to said saw; a shaft mounted on said frame; and cam means splined on said shaft for angular movement therewith and sliding movement thereon; a pair of opposed lugs on said member; said cam means being retained between said lugs; and means for turning said shaft to move said cam means into contact with said rail for clamping said member in adjusted position therealong.

5. In an adjustable gauge for use with a cut-off saw mechanism: an elongated frame adapted for mounting to extend transversely away from the saw and with one end adjacent said mechanism, said frame including a longitudinally extending, upstanding rail; a member having a gauging surface, and straddling said rail, supported and guided thereon for movement longitudinally of said frame; means adjacent said end for indicating the position of said surface with respect to said saw; a pair of opposed lugs extending from said member; a shaft mounted on said frame; said lugs having openings therein through which said shaft extends to permit sliding of the lugs on the shaft; a cam confined between said lugs; means forming a splined connection between said shaft and said cam; said cam being movable into and out of contact with said reel responsive to turning of said shaft; and means operable from an end of the frame for turning said shaft.

6. In an adjustable gauge for use with a cut-off saw mechanism: an elongated frame adapted for mounting to extend transversely away from the saw and with one end adjacent said mechanism, said frame including a longitudinally extending, upstanding rail; a member having a gauging surface, and straddling said rail, supported and guided thereon for movement longitudinally of said frame; means adjacent said end for indicating the position of said surface with respect to said saw; opposed portions on said members; cam means mounted for angular movement between said portions to engage said rail for clamping said member in adjusted position therealong; an angularly movable shaft extending longitudinally of said frame through said opposed portions; means forming a splined connection between said shaft and said cam means; means for operating said shaft and rollers on said member riding on said frame.

7. In an adjustable gauge for use with a cut-off saw mechanism: an elongated frame adapted for mounting to extend transversely away from the saw and with one end adjacent said mechanism; said frame including a longitudinally extending rail; a member having a gauging surface and guided for movement on said frame by portions extending on opposite sides of said rail; opposed lugs on said member; cam means mounted for angular movement between said lugs to engage one side of said rail and urge it into clamping engagement with that portion of said member on the opposite side of said rail; an angularly movable shaft extending longitudinally of said frame and through said lugs and said cam means; said member and said cam means being slidable on said shaft; and means for turning said shaft to operate said cam means.

References Cited in the file of this patent

UNITED STATES PATENTS

| Number | Name | Date |
|---|---|---|
| 334,141 | Welch | Jan. 12, 1886 |
| 1,123,711 | Driscoll | Jan. 5, 1915 |
| 1,289,034 | Hall | Dec. 24, 1918 |
| 1,375,159 | Krocker | Apr. 19, 1921 |
| 1,453,335 | Bennett | May 1, 1923 |
| 1,504,248 | Johnson | Aug. 12, 1924 |
| 1,823,268 | Gordon | Sept. 15, 1931 |
| 1,945,883 | Connelly | Feb. 6, 1934 |
| 2,326,416 | Tracy | Aug. 10, 1943 |
| 2,518,728 | Snow | Aug. 15, 1950 |

FOREIGN PATENTS

| Number | Country | Date |
|---|---|---|
| 29,817 | Sweden | Nov. 19, 1910 |